US005641171A

United States Patent [19]

Posey et al.

[11] Patent Number: 5,641,171

[45] Date of Patent: Jun. 24, 1997

[54] CONTAINER CADDY HAVING FOOT ACTIVATED SLIDING TOP CONTROL

[75] Inventors: John L. Posey, McHenry; Kerry L. Hanifl, Barrington Hills, both of Ill.

[73] Assignee: Sage Products, Inc., Crystal Lake, Ill.

[21] Appl. No.: 403,470

[22] Filed: Mar. 14, 1995

[51] Int. Cl.$^6$ .......... B62B 3/00

[52] U.S. Cl. .......... 280/47.34; 280/79.2

[58] Field of Search .......... 280/655.1, 47.26, 280/47.34, 47.35, 47.36, 47.371, 79.11, 79.2, 79.3, 79.5, 79.7; 220/260, 262, 908, 345, 348

[56] References Cited

U.S. PATENT DOCUMENTS

| | | | |
|---|---|---|---|
| 1,109,723 | 9/1914 | White | 220/262 |
| 1,164,583 | 12/1915 | Drapalik | 220/908 |
| 1,357,708 | 11/1920 | Jacobus | 220/262 |
| 2,351,597 | 6/1944 | Burlin | 220/262 |
| 4,670,227 | 6/1987 | Smith | 280/47.35 |
| 4,976,448 | 12/1990 | Wickersham et al. | 280/655.1 |
| 5,375,860 | 12/1994 | Ernsberger et al. | 280/47.35 |

*Primary Examiner*—Brian L. Johnson
*Assistant Examiner*—Frank Vanaman
*Attorney, Agent, or Firm*—Lee, Mann, Smith, McWilliams, Sweeney & Ohlson

[57] ABSTRACT

A container caddy for holding a waste container and having a foot activated mechanism for opening and closing the top of the waste container. The top opening mechanism includes a member for engaging the sliding top of the waste container and a linkage extending down to a foot pedal. The invention includes a receptacle for the waste container and a deployable handle for guiding movement of the container caddy. A quick disconnect latch is used to secure the opening mechanism to the sliding top of the waste container.

20 Claims, 4 Drawing Sheets

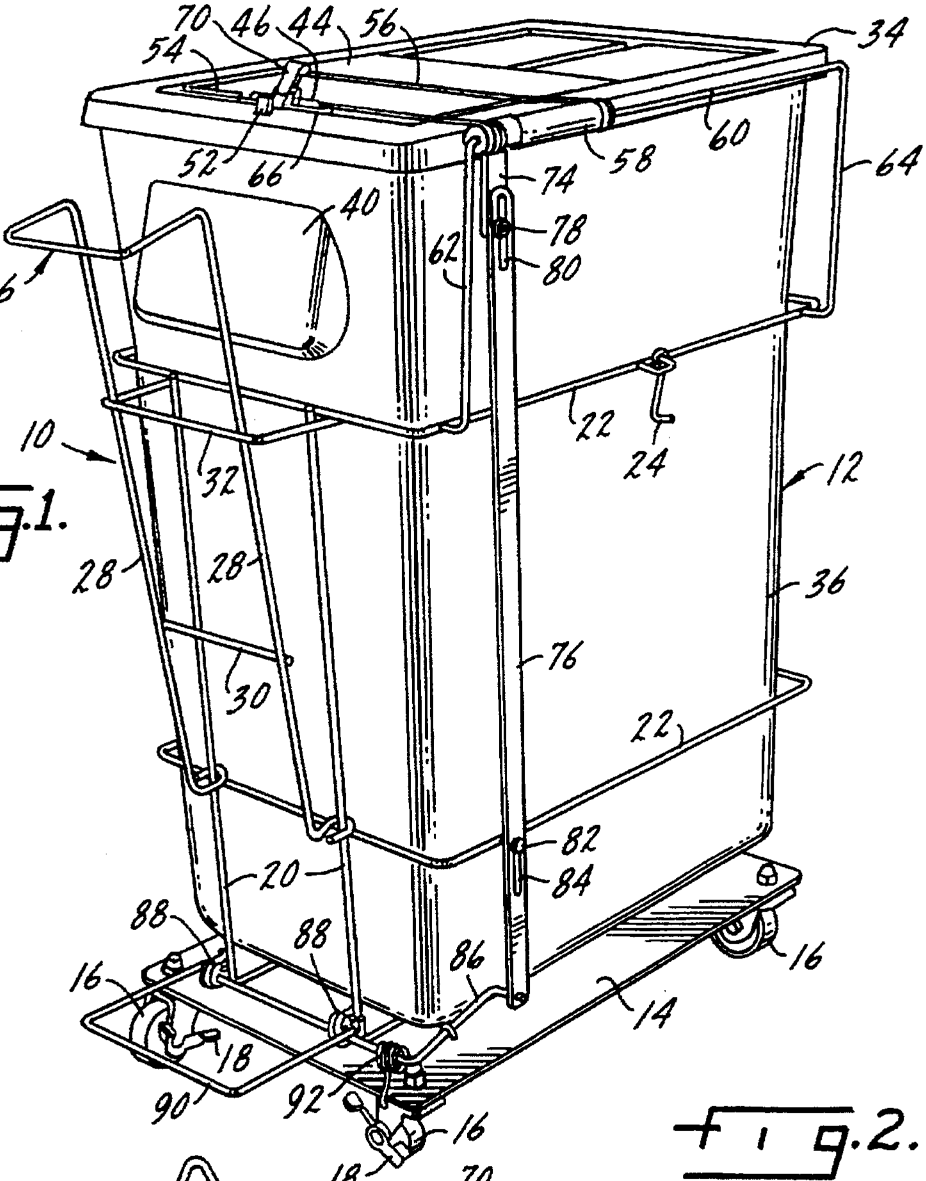
Fig.1.
Fig.2.
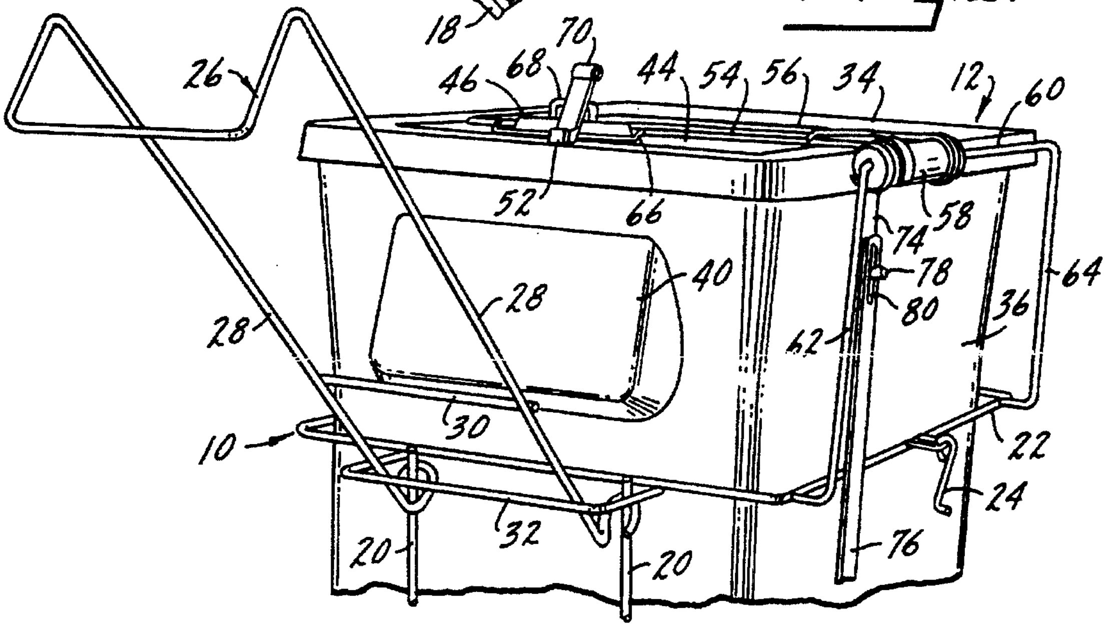

Fig. 3.
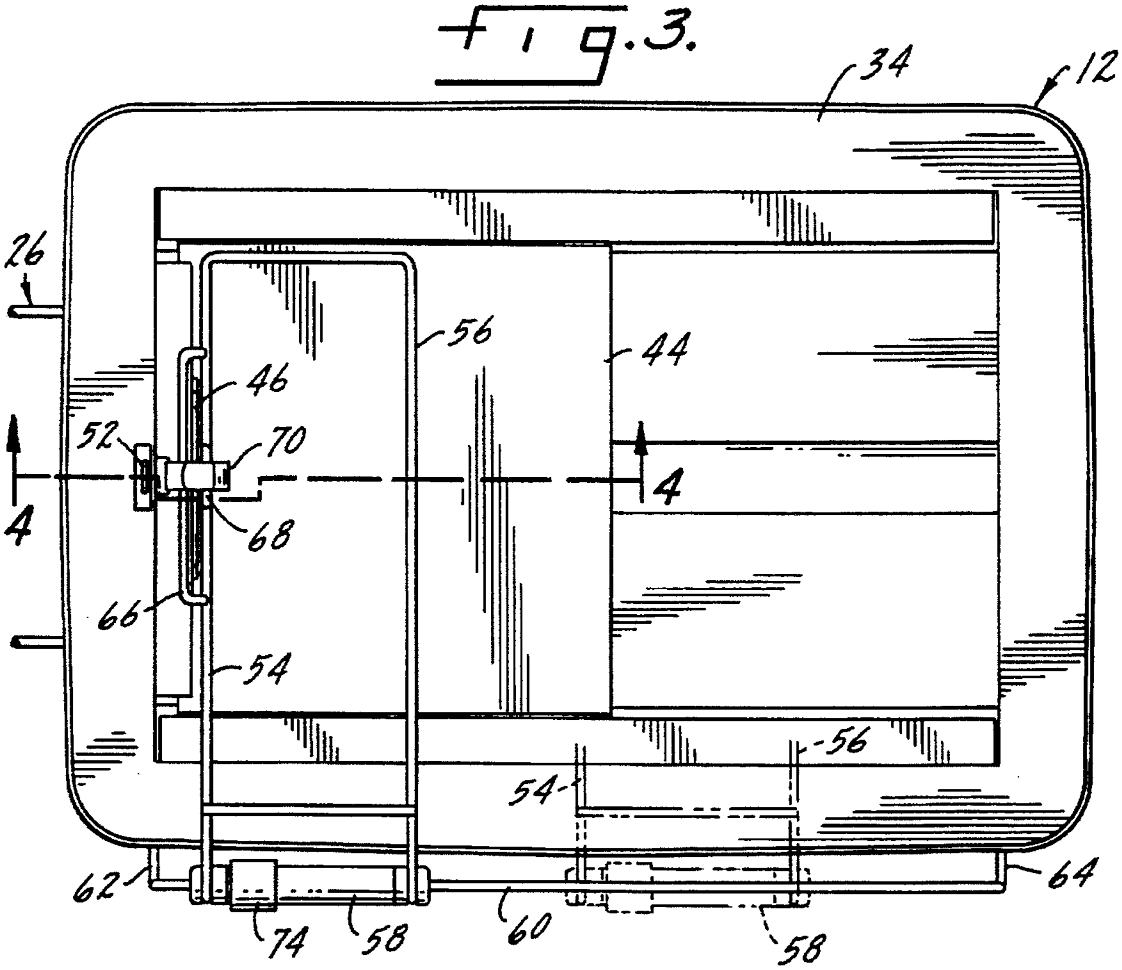
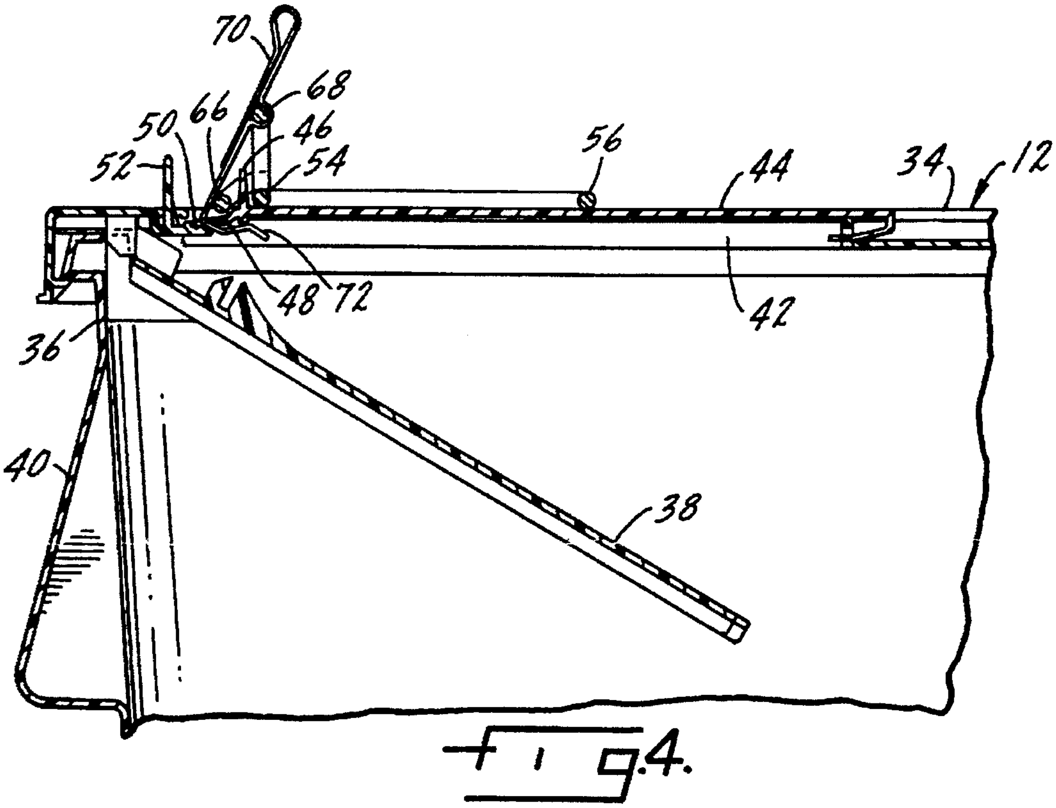
Fig. 4.

CONTAINER CADDY HAVING FOOT ACTIVATED SLIDING TOP CONTROL

BACKGROUND OF THE INVENTION

This invention relates to waste containers, and in particular to a caddy for a waste container having a foot activated mechanism for operating a sliding closure of a waste container carried by the caddy.

Waste containers, particularly those containers which are employed to dispose of contaminated articles, need to be formed to satisfy two competing requirements. First, the container must have an opening which is sufficiently large so that items to be disposed can readily be discarded, preferably without the need of the user physically opening the container. Second, because the container is used to dispose of contaminated items, it is important that access to the interior of the container be controlled, if at all possible. Thus, on the one hand it is desired to have the container as open as possible, but on the other hand, it is preferable to have the container closed at all times except when items are to be disposed.

When large volume containers are used for disposal of contaminated items, such as from an operation or during chemotherapy, often such containers have sliding tops. The top typically is slid open during use, and then slid to a closed and locked orientation when full and prior to disposal.

Because of the danger of contamination, it is preferred that the container be handled as little as possible, and also it be closed as often as possible. Therefore, opening of the container top by a remote mechanism, such as foot power, is preferred. Also, because the container can become quite unwieldy, transporting of the container in a convenient manner is quite desirable.

SUMMARY OF THE INVENTION

The invention relates to a container caddy. The caddy includes a bottom support and a container receptacle rising from the bottom support and secured thereto. Means is provided for opening a sliding top of a container which is located in the container receptacle. The opening means comprises an engagement member for engaging the sliding top, means mounting the engagement member on the container receptacle for translation along a path parallel to a path traversed by the sliding top, and means for effecting movement of the engagement member to open and close the sliding top. This latter means includes a pivot arm, with the invention also including means pivotally connecting the pivot arm at a central location to a single fixed pivot on the container receptacle. Means is provided on one side of the central location of the pivot arm to pivotally connect the pivot arm to the mounting means. Means is also provided for rotating the pivot arm about the fixed pivot, the rotating means including an actuator located on an opposite side of the central location of the pivot arm and pivotally connected to the pivot arm. Finally, means is provided for joining the engagement member to the sliding top.

In accordance with the preferred form of the invention, the container caddy includes a series of wheels which are attached to the bottom support for ease of transportation of the caddy. Means also is provided for guiding movement of the caddy. That means comprises a deployable handle. The container receptacle is composed of a series of support rods, and the handle includes at least one leg which is slidingly and pivotally secured to an upright support rod. A guard extends from the container receptacle at a top end of the support rod, with the guard maintaining the handle generally vertical in an undeployed position of the handle and permitting rotation of the handle to an extending orientation when the handle is in a deployed position.

The mounting means for the engagement member includes a rail, with the engagement member having a sleeve mounted on the rail. The engagement member also comprises at least one bar which extends from the sleeve. The means for joining the engagement member to the sliding top comprises a latch which is secured to the bar. The latch has a finger which is shaped to be engaged beneath the sliding top.

The pivot arm includes a slot at its central location. The means pivotally connecting the pivot arm at the central location comprises a pin at the fixed pivot which extends through the slot. The pivot arm also includes a slot at one end, and the means pivotally connecting the pivot arm to the mounting means comprises an actuation segment secured to and extending from the mounting means, and a pin secured to the actuation segment and extending in the slot.

The means for rotating the pivot arm about the fixed pivot includes a foot pedal, with the actuator extending from the foot pedal. Means also is provided for biassing the engagement member for temporarily retaining the sliding top of the container in a closed orientation. The biassing means comprises a spring on the actuator which bears against the bottom support.

BRIEF DESCRIPTION OF THE DRAWINGS

The invention is described in greater detail in the following description of an example embodying the best mode of the invention, taken in conjunction with the drawing figures, in which:

FIG. 1 is a perspective view of a container caddy according to the invention with a container mounted therein and with the sliding top of the container in a closed orientation, FIG. 2 is an enlarged perspective view of the top portion of the arrangement illustrated in FIG. 1, but with the handle for the container caddy being illustrated in its extended and deployed position, FIG. 3 is an enlarged top plan view of the container caddy according to the invention when holding a container, with the sliding top of the container being closed, and showing in phantom the position of the opening means for the container caddy when fully opened, FIG. 4 is an enlarged cross-sectional view of the top portion of the container caddy and container therein as taken along lines 4—4 of FIG. 3.

DESCRIPTION OF AN EXAMPLE EMBODYING THE BEST MODE OF THE INVENTION

Figure 6:
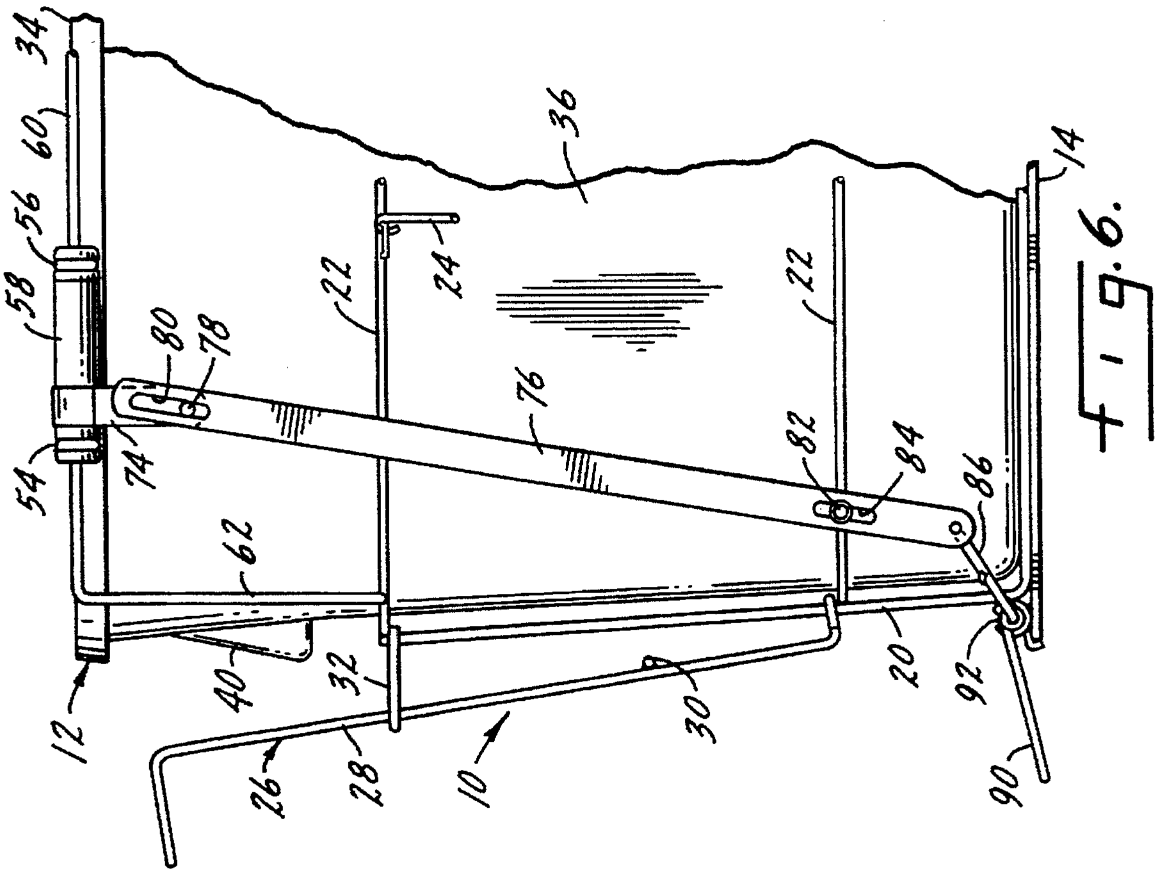
FIG. 6 is a view similar to FIG. 5, but showing the operation of the mechanism of the container caddy such that the sliding top of the container is approximately one third open.

A container caddy according to the invention is shown generally at 10 in the drawing figures. In all figures, the container caddy 10 includes a large volume container 12 which is retained in the caddy 10 and which is opened and closed by the caddy as will become apparent from the description below.

The caddy 10 includes a bottom support 14. A series of caster wheels 16 are provided at the four corners of the bottom support 14 to permit easy transportation of the caddy 10 and the container 12 during use. One or more of the caster wheels 16 may include a butterfly lock 18 to inhibit revolution of the wheel in order to retain the caddy in a particular location.

Figure 8:
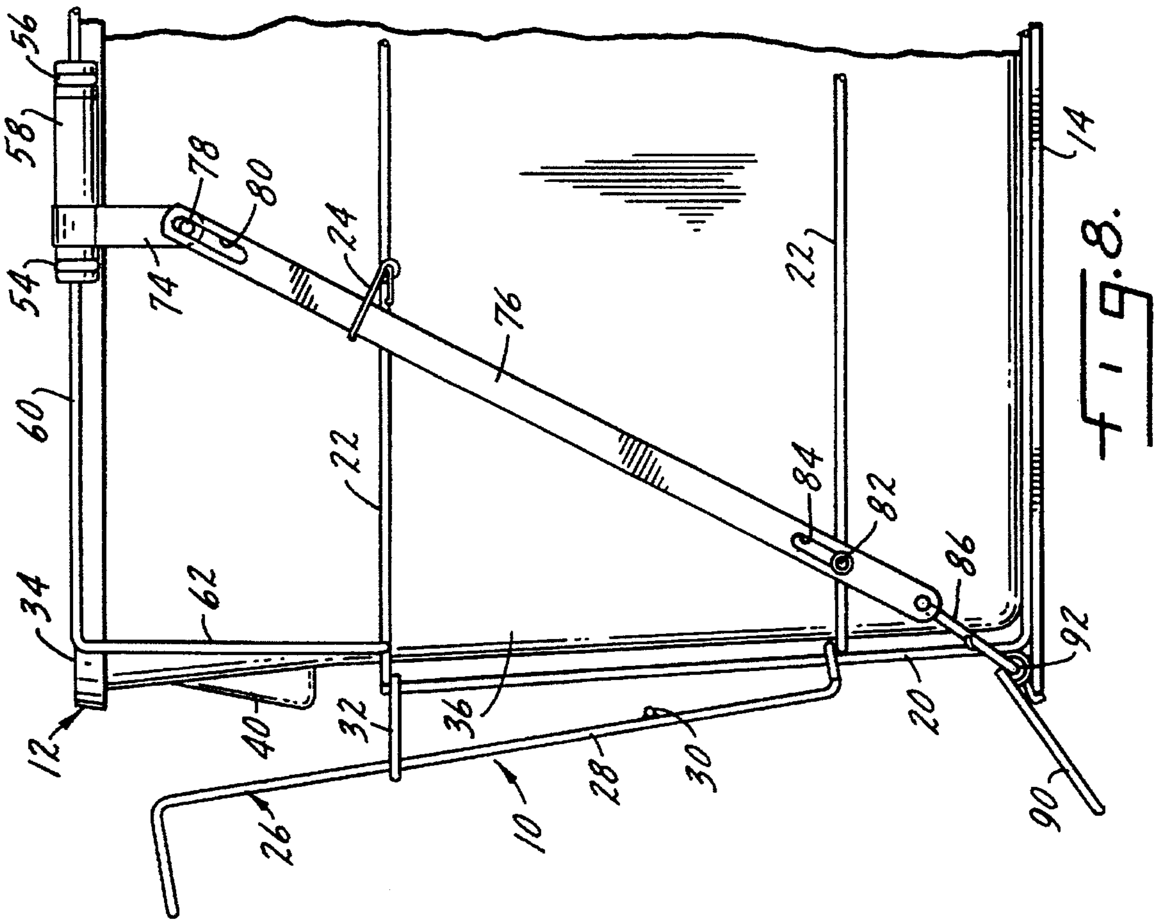
FIG. 8 is a view similar to FIG. 6, but with the top one hundred percent open and temporarily retained in the opened orientation.

A container receptacle, in the form of a wire cage, rises from the bottom support 14 and is appropriately secured appropriately thereto, such as by welding. The container receptacle comprises front and rear vertical support rods 20. While only the front rods 20 are illustrated, the rear vertical support rods are identical on the opposite side of the caddy 10. Also included in the container receptacle are at least two horizontal support rods 22 which surround the container 12 when installed in the caddy 10. The upper of the horizontal support rods 22 includes a catch 24 whose use is illustrated in FIG. 8 and which is described in greater detail below in relation to that figure. The support rods 20 and 22 are preferably welded to one another or otherwise appropriately affixed to form the container receptacle. They preferably are formed of metal in order to form a rigid receptacle for the container 12.

For guiding movement of the caddy 10, it includes a deployable handle 26. The handle 26 includes a pair of legs 28 which are slidingly looped on the vertical support rods 20 between the horizontal support rods 22. One or more horizontal braces 30 can be used to strengthen the handle 26 and provide appropriate spacing of the legs 28 when secured to the vertical support rods 20. A guard 32 is secured to the upper support rod 22 and extends outwardly from the caddy 10, as shown in the drawing figures. The handle 26 is captured between the guard 32 and the upper horizontal support rod 22 so that, as shown in FIG. 1, when the handle 26 is in an undeployed orientation, it is essentially vertical. However, when the handle 26 is raised upwardly to the deployed position shown in FIG. 2, it can be extended above the guard 32 to a more horizontal orientation and can then be used to aid in wheeling the caddy 10 about on the wheels 16.

The container 12 can generally comprise any container that fits within the caddy 10. However, since the caddy 10 is formed with a specific mechanism for opening the top of the container 12, it is preferred that the container 12 be a slide top container having a sliding top which works in conjunction with the caddy 10. The containers described in U.S. patent applications Ser. Nos. 322,578, filed Oct. 13, 1994 and 369,343, filed Jan. 6, 1995 are appropriate containers. The disclosures of these applications are incorporated herein by reference. The applications may also be referenced for greater detail regarding the particular depicted container 12 to obtain any additional detail that is not set forth in the description immediately below.

The container 12 includes a top portion 34, a container body 36 and, as shown in FIG. 4, a deployable protection chute 38. The top portion 34 may be affixed to the container body 36 in any manner so that the top portion preferably is essentially permanently secured to the container body 36. The container body 36 itself may be conventional and its size will depend on the nature of the container 12 and the caddy 10. The container body 36 is formed from plastic, and, as is conventional, includes opposite handles 40 for lifting of the container.

The top portion 34 includes an access aperture 42 (FIG. 4) which is sized to provide access to the interior of the container 12. As shown, the protection chute 38 underlies the access aperture 42 to protect access to the interior of the container 12 during use.

The top portion 34 also includes a sliding top 44. The sliding top 44 includes an upstanding handle 46 which facilitates sliding movement of the top 44. The top 44 is dimensioned to at least cover the access aperture 42 when the sliding top 44 is closed.

The sliding top 44 includes a lateral tongue 48 which is shaped to engage a rearwardly-extending tongue 50 extending from the top portion 34. The tongue 50 includes an actuating member 52 which, when depressed, depresses the tongue 50 downwardly within the container 12. The interengagement of the tongues 48 and 50 is described in greater detail in the incorporated references identified above.

The caddy 10, as mentioned above, is used to open and close the sliding top 44 when the container 12 is used when it is situated within the caddy 10. A top engagement member comprising a pair of spaced bars 54 and 56 is used for this purpose. As illustrated in the drawing figures, the bars 54 and 56 are actually integral portions of the engagement member, and extend from a sleeve 58 which is mounted on an elongated rail 60. The rail 60 actually comprises a horizontal portion of an upstanding mounting bracket which includes vertical arms 62 and 64 which are attached to the upper horizontal support rod 22.

As best shown in FIGS. 3 and 4, the bar 54 includes a forwardly-extending member 66. The handle 46 is captured between the member 66 and bar 54, and therefore horizontal movement of the bar 54 necessarily horizontally moves the sliding top 44.

The bar 54 also includes an upstanding member 68. A latch 70 is mounted on the member 68 and includes a finger 72 which is shaped to be engaged beneath the sliding top 44 at the extending tongue 48. The latch 70 assures that the bar 54 is rigidly secured to the sliding top 44 when the latch 70 is engaged. It is made from spring steel, or the like, and as best shown in FIG. 4, bears against the forwardly-extending member 66 when engaged beneath the sliding top 44.

The sleeve 58 is provided, internally, with an appropriate means, such as a self-lubricated bearing (not illustrated) to assure ready sliding along the rail 60. Also, since the sleeve 58 is cylindrical, when the latch 70 is disengaged, the bars 54 and 56 can be easily pivoted about the rail 60 above the container 12 to permit the container 12 to be withdrawn from the caddy 10. If desired, the sleeve 58 can be internally spring-biased to urge the bars 54 and 56 to a normal horizontal orientation over the container 12, as illustrated.

For hands-free utilization of the bar 54 to open and close the sliding top 44, an actuation segment 74 is secured to the sleeve 58, extending downwardly as shown. The actuation segment 74 is pivotally secured to an elongated pivot arm 76 by means of a pivot pin 78 engaged in a slot 80. The arm 76 extends downwardly as illustrated, and is secured to the lower horizontal support rod 22 at a fixed pivot 82 extending from the lower horizontal support rod 22 through a slot 84 formed centrally in the pivot arm 76. The pivot 82 is fixed in that, unlike any of the other pivot points described below in relation to movement of the pivot arm 76, this pivot point moves neither horizontally nor vertically in relation to the caddy 10.

The bottom end of the pivot arm 76 is pivotally secured to an actuator 86 which, as best shown in FIG. 1, is simply a bent rod passing through a pair of bushings 88 at the respective bottoms of the vertical support rods 20. The actuator 86 includes a foot pedal 90 extending outwardly from the bottom support 14 for engagement with a user's foot, as described in greater detail a short distance below. A spring 92 is engaged on the actuator 86, and bears against the bottom support 14 as shown. Therefore, the spring 92 tends to bias the foot pedal upwardly, and therefore the actuator 86 downwardly in relation to its end secured to the pivot arm 76, normally maintaining the sliding top 44 in a closed orientation over the access aperture 42.

After the container 12 is installed in the caddy 10, and the latch 70 is engaged on the sliding lid 44, the lid 44 is opened and closed by appropriate depression or release of the foot pedal 90. FIGS. 5 through 8 illustrate a sequence of opening of the sliding top 44, with FIG. 3 illustrating, in phantom, the final position of the sleeve 58 when the sliding top 44 has been fully opened.

Figure 5:
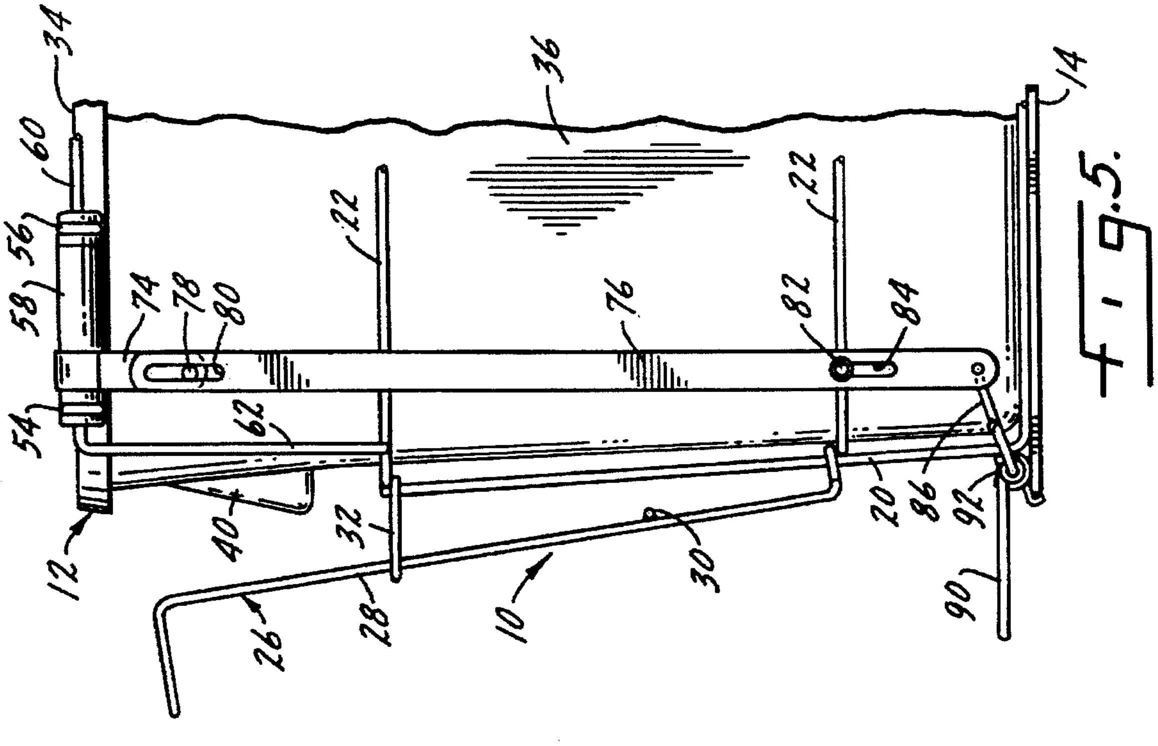
FIG. 5 is a partial elevational view of the left hand portion of the container caddy illustrated in FIG. 1, with the wheels removed and with the sliding top of the container fully closed.

In FIG. 5, the foot pedal 90 as yet to be depressed, and therefore the sliding top 34 is fully closed. At this point, as illustrated, the pivot arm 76 is seated downwardly with the fixed pivot 82 at the top of the slot 84 and with the pivot pin 78 at an intermediate location in the slot 80. When the foot pedal 90 is then depressed and the sliding top 44 is approximately one-third open, the orientation is as illustrated in FIG. 6. At this point, the pivot arm 76 has risen upwardly so that the fixed pivot 82 is in an intermediate location in the slot 84. The pivot pin 78 has approached the bottom of the slot 80, and the pivot arm 76 has pivoted to the right above the fixed pivot 82, forcing the sleeve 58 to the right and therefore partially opening the sliding top 44.

Figure 7:
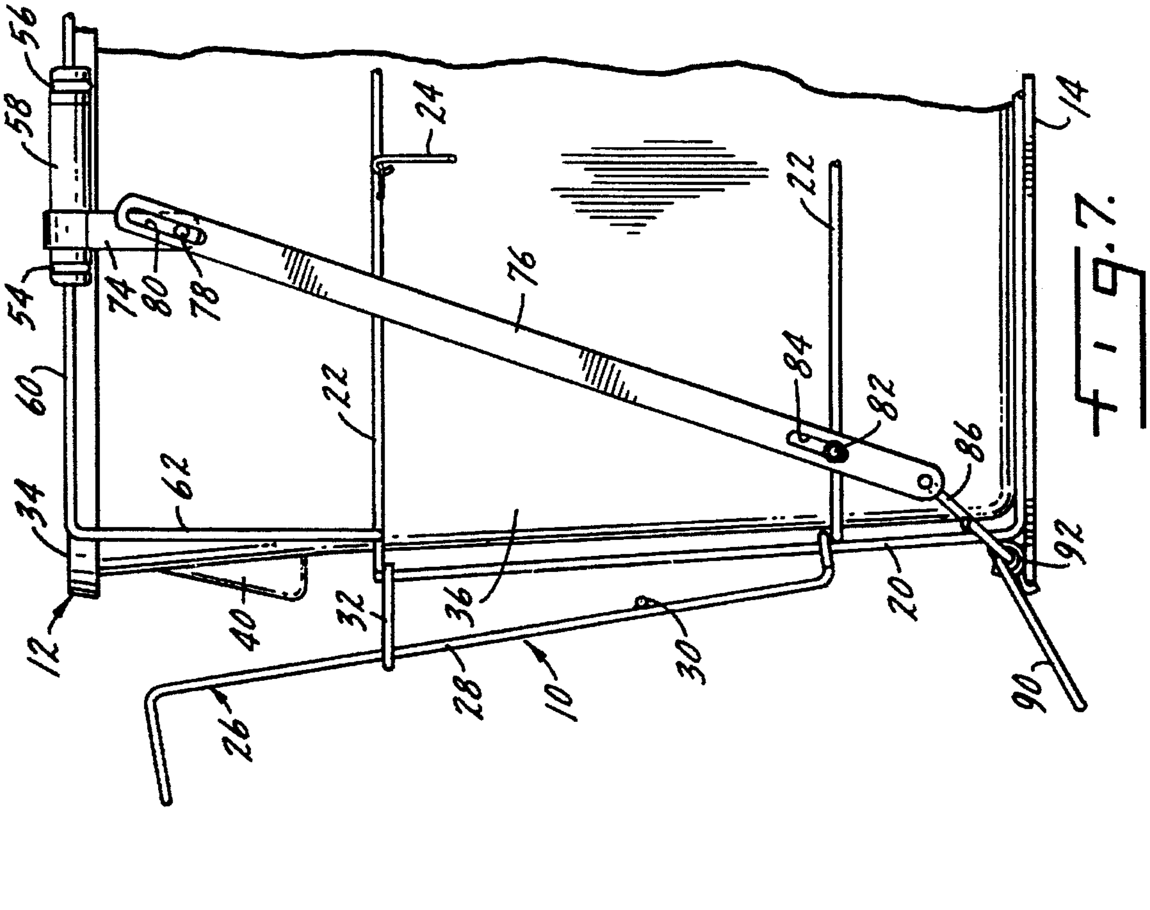
FIG. 7 is a view similar to FIG. 6, but with the top approximately two thirds open.

In FIG. 7, the foot pedal 90 has been further depressed, and the sliding top 44 is approximately two-thirds open. In this orientation, the fixed pivot 82 is practically at the bottom of the slot 84, and the pivot arm 76 has rotated further to the right above the fixed pivot 82. At this point, the pivot pin 78 begins to return to a more central location within the slot 80 as the sleeve 58 slides further to the right along the rail 60.

In FIG. 8, the sliding top 44 is 100% open. In this orientation, the fixed pivot 82 is bottomed in the slot 84, while the pivot pin 78 is practically at the top of the slot 80. The sleeve 58 has therefore traveled practically as far as possible along the rail 60, opening the sliding top 44 completely.

In the fully opened orientation as shown in FIG. 8, the catch 24 can be engaged on the pivot arm 76 to retain the sliding top 44 open. Since the spring 92 normally urges the actuator 86 downwardly, therefore urging the top of the pivot arm 76 to the left and attempting to close the sliding top 44, the catch 24 overcomes the force of the spring 92 to retain the sliding top 44 in the fully opened orientation. By simple release of the catch 24 from the pivot arm 76, the force of the spring 92 returns the pivot arm 76 to the orientation shown in FIG. 5, automatically closing the sliding closure 44 to the position shown in FIGS. 1 through 4.

As explained in the incorporated patent applications, for final closure of the sliding top 44, the tongue 48 is engaged on the tongue 50. However, that is not possible until the latch 70 is disengaged from the sliding top 44, since the latch 70 is interposed between the tongues 48 and 50. Therefore, the latch 70 serves as a preventative from premature locking of the sliding top 44 on the container 12. Once the latch 70 has been disengaged from beneath the sliding top 44, it can then be engaged for final closure.

Various changes can be made to the invention without departing from the spirit thereof or scope of the following claims.

What is claimed is:

1. A container caddy, comprising a. a bottom support, b. a container receptacle rising from said bottom support and secured thereto, said container receptacle being shaped to accommodate a replaceable container removably installed therewithin, c. means for opening a sliding top of the replaceable container when located in said container receptacle, said opening means comprising i. an engagement member for engaging the sliding top, ii. means mounting said engagement member on said container receptacle for translation on said container receptacle along a straight path parallel to a path traversed by the sliding top, iii. means for effecting movement of said engagement member to open and close the sliding top, including a pivot arm, iv. means pivotally connecting said pivot arm at a central location to a single fixed pivot on said container receptacle, v. means on one side of said central location pivotally connecting said pivot arm to said mounting means, vi. means for rotating said pivot arm about said fixed pivot, said rotating means including an actuator located on an opposite side of said central location and pivotally connected to said pivot arm, and d. releasable means for temporarily joining said engagement member to the sliding top.

2. A container caddy according to claim 1 including a series of wheels attached to said bottom support for transportation of said caddy.

3. A container caddy according to claim 1 including means for guiding movement of said caddy.

4. A container caddy according to claim 3 in which said means for guiding movement comprises a deployable handle.

5. A container caddy according to claim 4 in which said container receptacle includes a support rod, and said handle includes a leg slidingly and pivotally secured to said support rod.

6. A container caddy according to claim 5 including a guard extending from said container receptacle at a top end of said support rod, said guard maintaining said handle generally vertical in an undeployed position of said handle and permitting rotation of said handle to an extended orientation when in a deployed position.

7. A container caddy according to claim 1 in which said mounting means includes a rail, said engagement member including a sleeve mounted on said rail.

8. A container caddy according to claim 7 in which said engagement member comprises at least one bar extending from said sleeve.

9. A container caddy according to claim 8 in which said joining means comprises a latch secured to said bar, said latch including a finger shaped to be engaged beneath the sliding top.

10. A container caddy according to claim 1 in which said pivot arm includes a slot at said central location, and in which said means pivotally connecting said pivot arm at a central location comprises a pin at said fixed pivot extending through said slot.

11. A container caddy according to claim 1 in which said pivot arm includes a slot at one end, and said means pivotally connecting said pivot arm to said mounting means comprises an actuation segment secured to and extending from said mounting means and a pin secured to said actuation segment and extending in said slot.

12. A container caddy according to claim 1 in which said rotating means includes a foot pedal, said actuator extending from said foot pedal.

13. A container caddy according to claim 12 including means biasing said engagement member for temporarily retaining the sliding top in a closed orientation.

14. A container caddy according to claim 13 in which said biasing means comprises a spring on said actuator and bearing against said bottom support.

15. A container caddy, comprising a. a bottom support, b. a container receptacle rising from said bottom support and secured thereto, c. means for opening a sliding top of a container located in said container receptacle, said opening means comprising i. an engagement member for engaging the sliding top, ii. means mounting said engagement member on said container receptacle for translation along a path parallel to a path traversed by the sliding top, said mounting means including a rail, said engagement member including a sleeve mounted on said rail, iii. means for effecting movement of said engagement member to open and close the sliding top, including a pivot arm, iv. means pivotally connecting said pivot arm at a central location to a single fixed pivot on said container receptacle, v. means on one side of said central location pivotally connecting said pivot arm to said mounting means, vi. means for rotating said pivot arm about said fixed pivot, said rotating means including an actuator located on an opposite side of said central location and pivotally connected to said pivot arm, and d. means for joining said engagement member to the sliding top.

16. A container caddy according to claim 15 in which said rotating means includes a foot pedal, said actuator extending from said foot pedal.

17. A container caddy according to claim 16 including means biasing said engagement member for temporarily retaining the sliding top in a closed orientation.

18. A container caddy, comprising a. a bottom support, b. a container receptacle rising from said bottom support and secured thereto, c. means for opening a sliding top of a container located in said container receptacle, said opening means comprising i. an engagement member for engaging the sliding top, ii. means mounting said engagement member on said container receptacle for translation along a path parallel to a path traversed by the sliding top, iii. means for effecting movement of said engagement member to open and close the sliding top, including a pivot arm, iv. means pivotally connecting said pivot arm at a central location to a single fixed pivot on said container receptacle, v. means on one side of said central location pivotally connecting said pivot arm to said mounting means, vi. means for rotating said pivot arm about said fixed pivot, said rotating means including an actuator located on an opposite side of said central location and pivotally connected to said pivot arm, vii. said pivot arm including a slot at said central location, said means pivotally connecting said pivot arm at a central location comprising a pin at said fixed pivot extending through said slot, and d. means for joining said engagement member to the sliding top.

19. A container caddy according to claim 18 in which said rotating means includes a foot pedal, said actuator extending from said foot pedal.

20. A container caddy according to claim 19 including means biasing said engagement member for temporarily retaining the sliding top in a closed orientation.

* * * * *